United States Patent [19]

Matthews

[11] Patent Number: 5,247,976
[45] Date of Patent: Sep. 28, 1993

[54] ADJUSTABLE SUPPORT ATTACHMENT FOR MOUNTING TO A BASE

[76] Inventor: Marc R. Matthews, 2610 NE. 8th Ter., Pompano Beach, Fla. 33064

[21] Appl. No.: 932,775

[22] Filed: Aug. 20, 1992

[51] Int. Cl.⁵ .............................................. B25H 1/02
[52] U.S. Cl. .................................. 144/287; 144/286 R; 182/129; 182/181; 248/397; 269/289 MR; 269/901
[58] Field of Search .............................. 182/129, 181; 144/286 R, 286 A, 287; 248/397; 269/389 MR, 901

[56] References Cited

U.S. PATENT DOCUMENTS

| | | | |
|---|---|---|---|
| 2,222,078 | 11/1940 | Kroeger | 182/129 |
| 2,766,788 | 10/1956 | Kahn | 144/286 R |
| 3,199,825 | 8/1965 | Bellows | 248/397 |
| 3,636,526 | 4/1953 | Madden | 144/286 R |
| 4,640,326 | 2/1987 | Hewitt | 144/287 |
| 4,753,279 | 6/1988 | Harris | 144/287 |
| 4,785,911 | 11/1988 | Kayl | 182/129 |
| 5,082,037 | 1/1992 | Hammons et al. | 144/286 A |

Primary Examiner—W. Donald Bray
Attorney, Agent, or Firm—Malin, Haley, DiMaggio & Crosby

[57] ABSTRACT

An adjustable workpiece support attachment is disclosed for mounting to a base to facilitate the handling of long or unwieldy stock in stationary power tools and the like, the workpiece support attachment including a generally laterally extending workpiece engaging member having two adjacent sides in the form of a wing movable between a platform-like position and a ramp-like position to compensate for the natural downturn of material coming off of the work surface. The workpiece support attachment further includes generally vertically disposed extension members pivotably mounted to the workpiece engaging member for attachment to the base, and a means for releasably securing the extension member to facilitate height adjustment of the workpiece support attachment on the base.

15 Claims, 5 Drawing Sheets

ADJUSTABLE SUPPORT ATTACHMENT FOR MOUNTING TO A BASE

BACKGROUND OF THE INVENTION

1. Field of the Invention

The present invention relates to an adjustable support attachment to facilitate the handling of long or unwieldy stock in stationary power tools and the like, and more particularly, to a support attachment which is adapted for mounting on a base and which is readily adjustable, collapsible, and portable.

2. Description of the Prior Art

When performing carpentry or machining operations, it is sometimes desirable to provide support for portions of the work piece. A variety of support devices are generally available for supporting long or unwieldy stock, such as long pieces of lumber or large sections of plywood or wall paneling that are being processed in stationary power tools, such as table saws, radial arm saws, routers, table surface planers, etc.

Prior art support devices have generally been of two types. A first type is bolted or otherwise attached to the power tool while extending outwardly from a table or other main portion of the tool. Such devices are understandably of limited use since they can only be spaced a relatively short distance from the power tool, thereby often being incapable of providing the type of support contemplated where necessary to handle long or unwieldy stock or work pieces in the power tool.

Another type of support device is of a freestanding type capable of movement relative to the power tool for overcoming the limitation referred to above. The most common freestanding type of support device includes a single roller vertically adjustable on a tripod-like base. However, such roller stands have many shortcomings, the most notable of which is instability. Such roller stands cannot be set to the table height without the natural downturn of the wood coming off the table knocking over the stand. Furthermore, roller stands use a fixed axis which must be set perpendicular to the saw blade rip fence so as not to push or pull material from the rip fence. In addition, these support devices are relatively bulky and difficult to store and are designed to function in very limited capacities.

Yet another freestanding support device available in the prior art includes one or more rollers forming a top surface for a four-legged table. Again, these support devices are relatively bulky and difficult to store.

Therefore, it would be desirable to provide an improved work support which could offer improved stability, ease of operation, and portability; one which could be readily stored and employed when desired as an independently movable and stable support device, as well as being mounted on a platform that could otherwise serve a basic need such as a sawhorse, with the adjustability necessary for facilitating the handling of long or unwieldy stock in stationary and portable power tools. In that regard, the present invention particularly contemplates the handling of long lengths or panels of lumber, plywood, and the like in stationary power tools such as those described above.

SUMMARY OF THE INVENTION

The instant invention is directed to an adjustable workpiece support attachment for mounting to a base to facilitate the handling of unwieldy workpieces. The support attachment is generally comprised of a generally laterally extending workpiece engaging member having two adjacent sides, a roller means attached to one of those sides, a generally vertically disposed extension member pivotally mounted to the workpiece engaging member for attachment to the base, and a means for releasably securing the extension member to facilitate height adjustment of the workpiece support attachment.

The two sides of the workpiece engaging member are hingedly attached for movement between a first, platform-like position and a second, ramp-like position. When the engaging member is in its ramp-like position, it provides a large tolerance area and compensates for the natural downturn of material coming off of the table saw surface while still providing a stable support surface that will return the downwardly turned stock back to the plane of the working surface. For example: assume a long piece of lumber coming off a table saw surface has a downturn such that the lumber is below the height of the table. With the present invention in its ramp-like position, the engaging member, whose longer side is constructed of a low friction, non-marring material, would allow the lumber to "ride" up the ramp to the ramp's apex, where the lumber is again aligned with the table height. The lumber would then pass over the apex, engage the roller means, and continue to move smoothly away from the operator on a consistent plane with the table saw surface. This is especially important when engaging in mitered rips for consistency in width. Additionally, this allows one-person operation in field situations formerly requiring two persons where the operator will be able to concentrate solely on his infeed control rather than also being concerned with outfeed control.

In compensating for the natural downturn of material, the support attachment allows optimum accuracy from the operator. Furthermore, no excessive downward pressure is required by the operator to keep the workpiece flush with the surface of the table saw, thereby minimizing the chances of operator injury.

As mentioned above, the engaging member is also capable of being put in a platform-like position. This configuration is particularly useful when the operator is using the table saw to crosscut rather than to rip. It should be noted that when the engaging member is in its platform-like position, the workpiece will not contact the roller means.

In accordance with the instant invention, it is an object thereof to provide an adjustable workpiece support attachment for mounting to a base to facilitate the handling of unwieldy workpieces in stationary power tools whereby the height of the support attachment can be vertically adjusted for alignment with a table or other portion of the power tool.

It is a further object of the invention to provide an adjustable workpiece support attachment which compensates for the natural downturn of material coming off of the working surface.

It is still a further object of the invention to provide such an adjustable workpiece support attachment that offers improved stability, ease of operation, and portability, along with a base that could serve a crossover function such as a sawhorse.

It is yet an additional object of the present invention to provide an adjustable workpiece support attachment which can be readily stored and employed when desired as an independently movable and stable support attachment.

These and other advantages and features of the present invention will become readily apparent from the following detailed description of the invention, from the claims, and from the accompanying drawings.

DESCRIPTION OF THE PREFERRED EMBODIMENT

Figure 1:
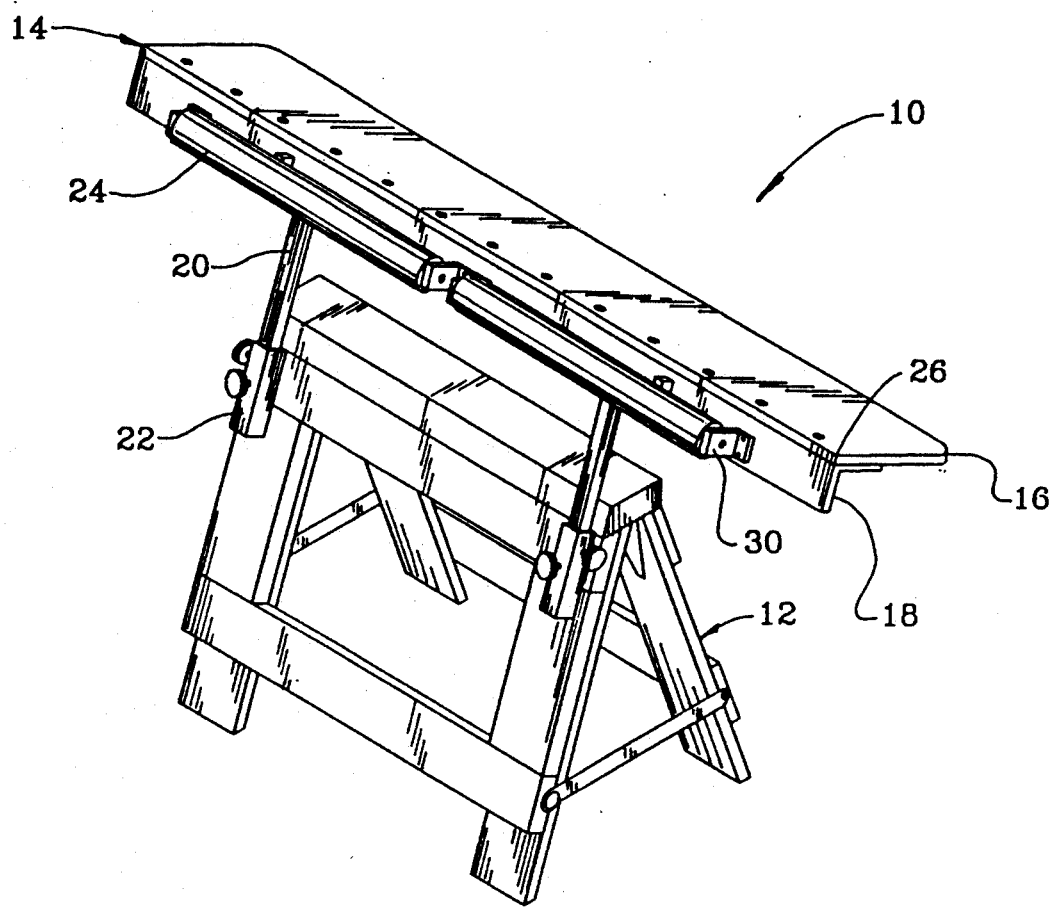
FIG. 1 is a view in perspective of an adjustable support attachment constructed according to the present invention, mounted to a base.

Referring now to the drawings and particularly to FIG. 1, an adjustable workpiece support attachment is generally indicated at 10 for mounting to a base 12 in order to support long or unwieldy stock or workpieces being processed by a stationary power tool, such as a table saw. It will also be apparent that the adjustable workpiece support attachment 10 can similarly be employed with other power tools, stationary and portable, such as those described above.

Figure 8:
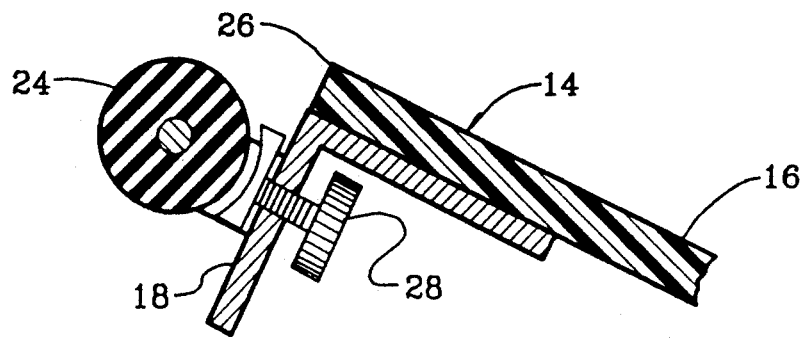
FIG. 8 is an enlarged, side elevational view of the device showing the adjustable tension of the roller means.

The device 10 includes a generally laterally extending workpiece engaging member 14. The workpiece engaging member 14 is adapted to engage the underside portion of the workpiece. The engaging member 14 includes two adjacent sides 16 and 18, with side 16 being constructed of a low friction, non-marring material. The two sides 16 and 18 are in the form of an extension wing and form a generally L-shaped member. In a preferred embodiment, the sides 16 and 18 are hingedly attached for movement between a first, platform-like position and a second, ramp-like position. The preferred embodiment of the support attachment 10, as shown in FIG. 1, also includes removable roller means 24 mounted to the shorter 18 of the two adjacent sides 16 and 18 such that the roller 24 is at all times below the apex 26 of the engaging member 14. The roller means is preferably a cylindrical roller which is mounted at each end to a retainer bracket 30. In an alternate embodiment (not shown), the roller means 24 may be non-fixed axis, self-cleaning balls, such as ball bearings. In the preferred embodiment shown in FIG. 8, the roller 24 has an adjustable tension 28, which allows an operator to release a workpiece after cut-through without worry of the workpiece sliding away from the operator and onto the floor.

Figure 3:
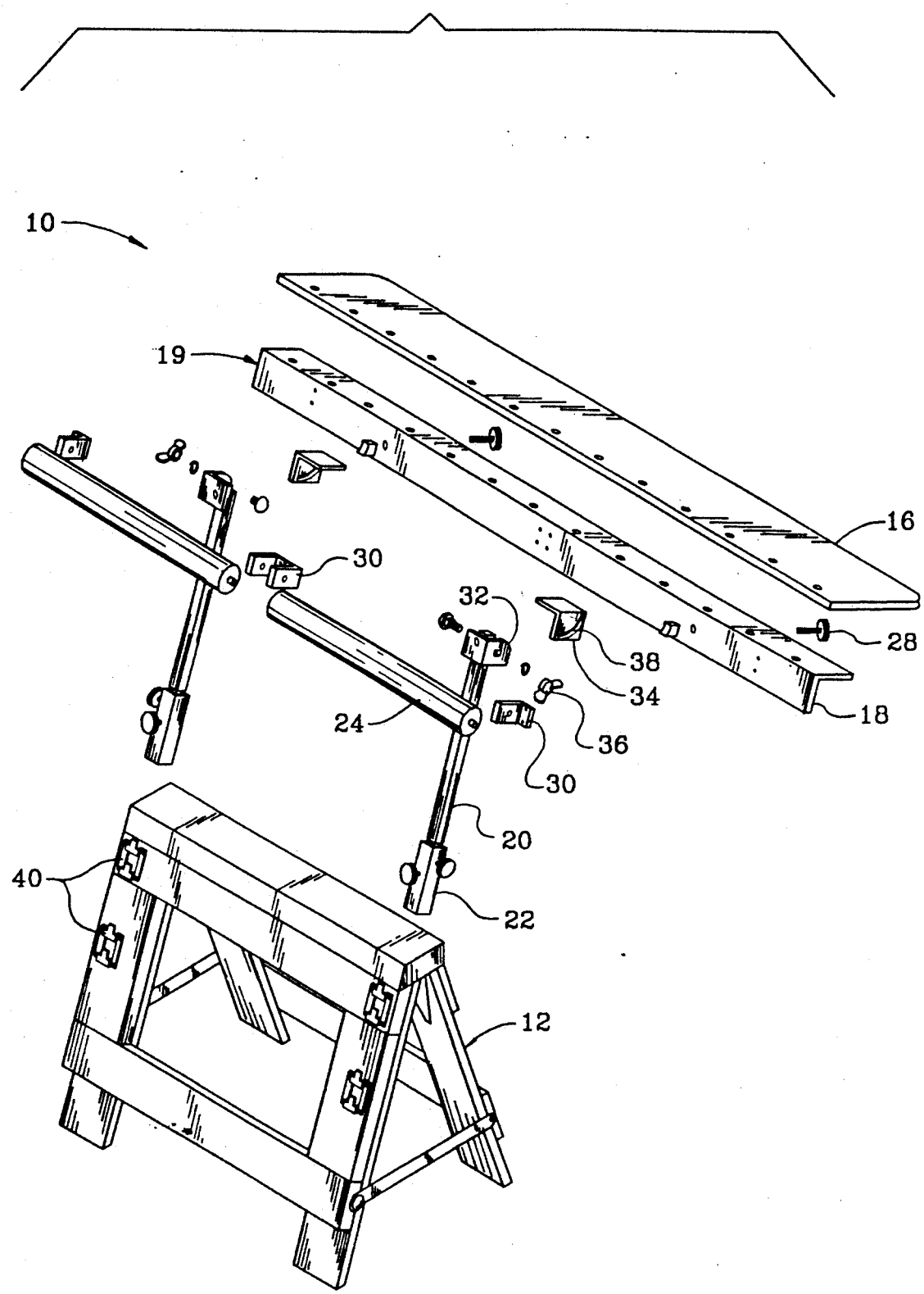
FIG. 3 is an exploded isometric view of the device.

As illustrated in FIG. 1, support attachment 10 further includes generally vertically disposed extension member 20 connected to base 12 by manually operable locking collar 22. Collar 22 provides a means for releasably securing extension member 20 to base 12 to facilitate vertical movement or height adjustment of support attachment 10 on base 12. Collar 22 is secured to base 12 by bracket 40, as shown in FIG. 3.

Figure 4:
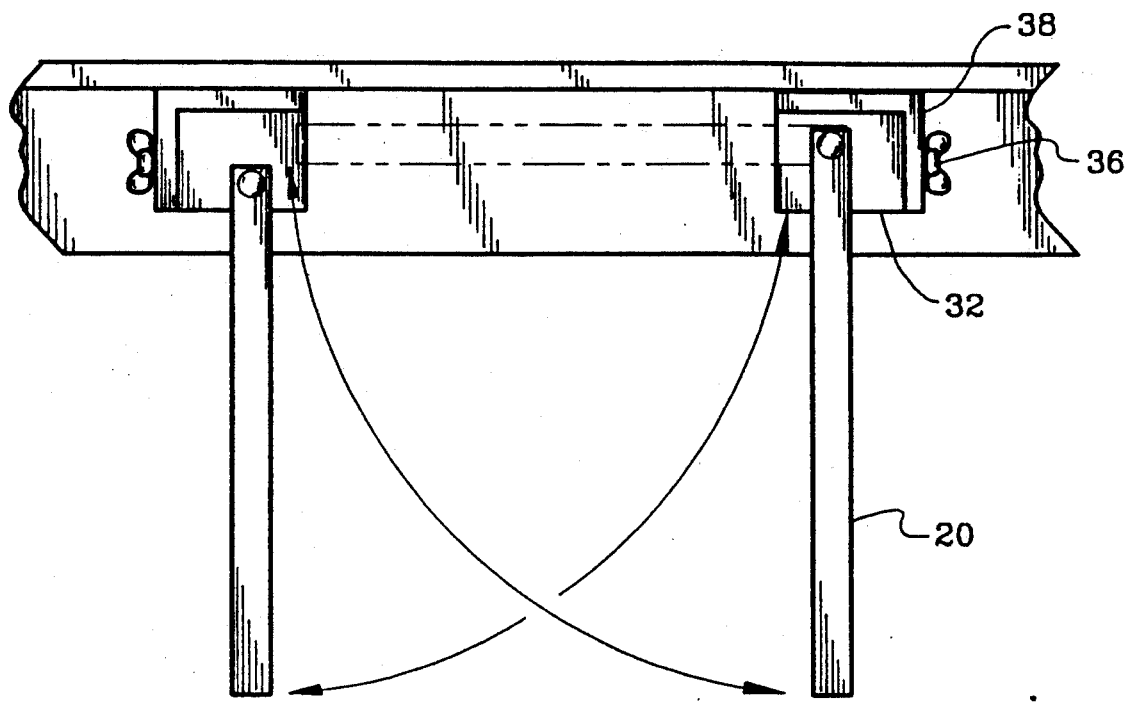
FIG. 4 is a rear elevational view of the device showing the pivotal nature of the extension member.

As best seen in FIG. 4, extension member 20 is pivotably secured to workpiece engaging member 14 by bracket 32 so that extension member 20 may be pivoted inwardly to a generally lateral position for ease of storage of the support attachment 10.

Figure 2:
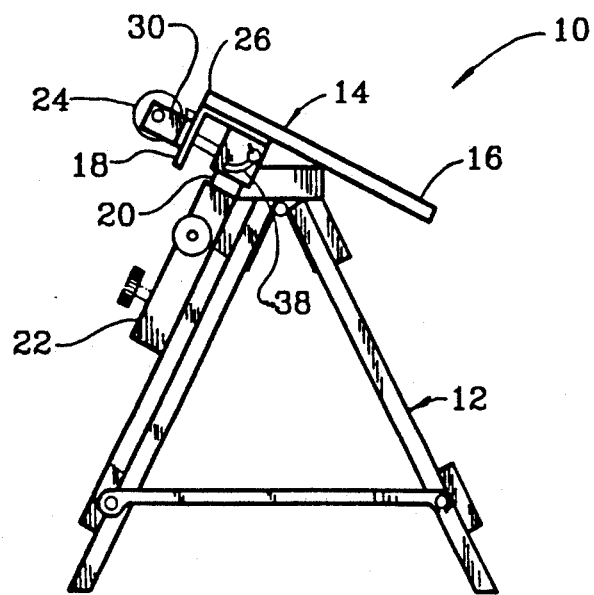
FIG. 2 is a side elevational view of the device.
Figure 5:
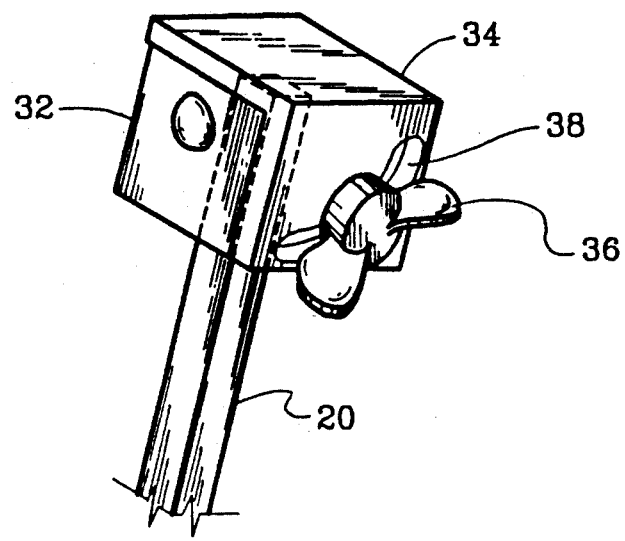
FIG. 5 is an enlarged, perspective view of the bracketing means of the device.
Figure 6:
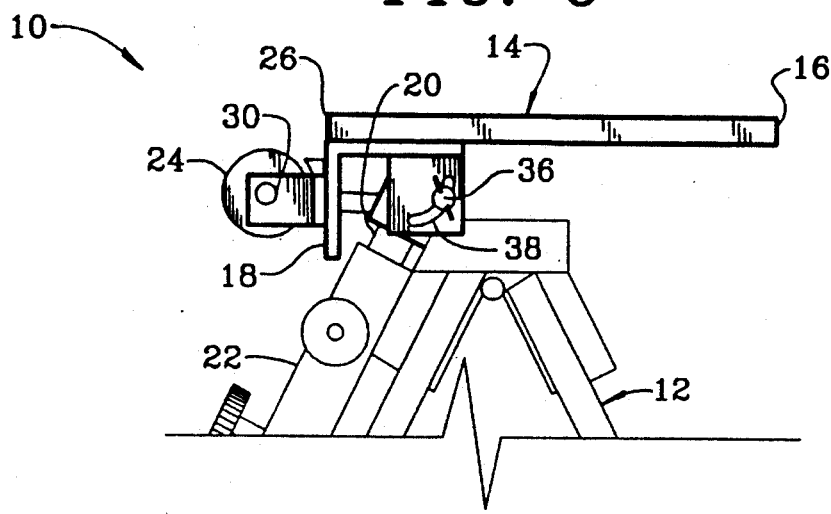
FIG. 6 is an enlarged, side elevational view of a portion of the device shown in a platform-like position.
Figure 7:
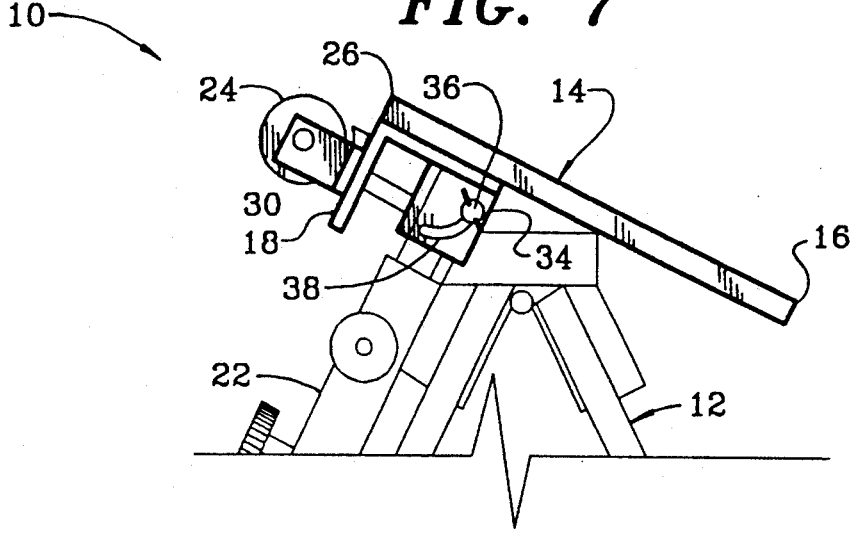
FIG. 7 is an enlarged, side elevational view of a portion of the device shown in a ramp-like position.
Figure 9:
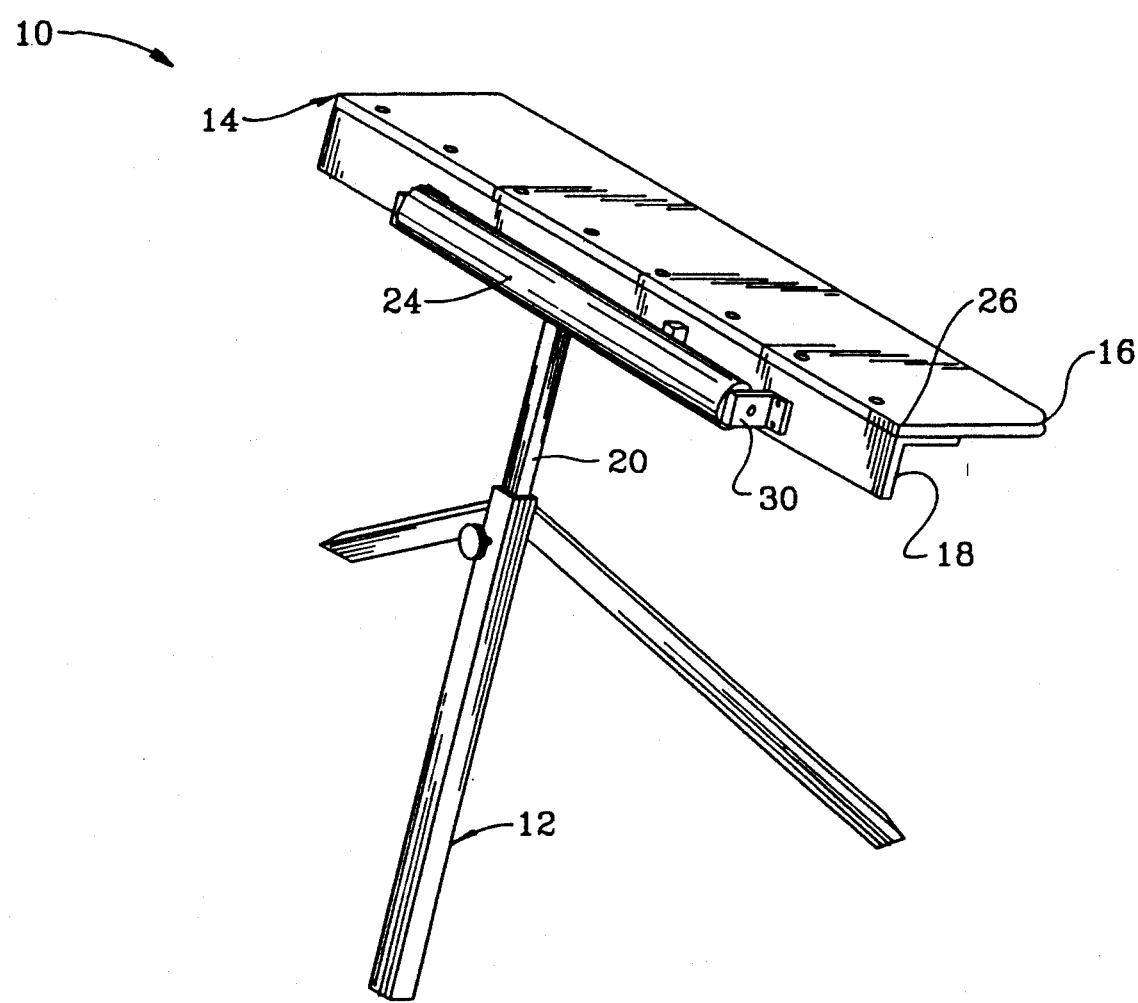
FIG. 9 is a view in perspective of an alternate embodiment of the present invention, mounted to a tripod-like base.

The workpiece engaging member 14 is positioned between a first, platform-like position as seen in FIG. 6, and a second, ramp-like position as seen in FIG. 7 in the following manner. Referring to FIGS. 3 and 5, wing nut 36 is loosened and translated in slot 38, thereby allowing bracket 34 to be pivoted about bracket 32. Bracket 34 is fixedly attached to angle iron 19. Angle iron 19 is attached to side 16. Therefore, by pivoting bracket 34, angle iron 19 is also pivoted, which in turn allows workpiece engaging member 14 to be positioned in either a ramp-like or platform-like position. As illustrated in FIGS. 1 through 3, the preferred embodiment of base 12 is a four-legged structure such as a saw horse. However, FIG. 9 shows an alternate embodiment of the present invention mounted to a tripod-like base.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An adjustable workpiece support attachment for mounting to a base to facilitate the handling of unwieldy workpieces comprising:

a generally laterally extending workpiece engaging member for being positioned to engage and support at least a portion of said workpiece, said workpiece engaging member having two adjacent sides hingedly attached for movement between a first position and a second position, said two adjacent sides secured in an abutting relationship forming a downwardly facing angle less than 180°, wherein the apex of said workpiece engaging member provides an area of contact for said workpiece, said workpiece passing over said apex;

at least one generally vertically disposed extension member pivotally mounted to said workpiece engaging member for sliding attachment to said base; and means for releasably securing said extension member to facilitate height adjustment of said workpiece support attachment on said base.

2. The support attachment of claim 1 wherein said two adjacent sides form a generally L-shaped member with one of said adjacent sides being longer than the other one of said adjacent sides.

3. The support attachment of claim 2 wherein said adjacent sides are pivotable such that said longer one of said adjacent sides is capable of forming an inclined ramp-like structure or a flat, platform-like structure.

4. The support attachment of claim 1 further including a removable roller means attached to the shorter one of said adjacent sides such that said roller means is at all times below the apex of said workpiece engaging member such that when said longer one of said adjacent sides is in said ramp-like position, the workpiece will come into contact with said roller means after passing over the apex of said workpiece engaging member, and when said longer one of said adjacent sides is in said platform-like position, the workpiece will not contact said roller means.

5. The support attachment of claim 2 wherein said longer one of said adjacent sides is constructed of a low friction, non-marring material.

6. The support attachment of claim 4 wherein said roller means is an elongated cylinder.

7. The support attachment of claim 4 wherein said roller means has an adjustable tension, thereby allowing an operator to release a work piece after cut through without worry of the work piece sliding or rolling away from the operator and onto the floor.

8. The support attachment of claim 1 wherein said extension member pivots inwardly to a generally lateral position for ease of storage.

9. The support attachment of claim 1 wherein said base is a four-legged stand, such as a saw horse.

10. The support attachment of claim 1 wherein said base is a tripod.

11. The support attachment of claim 11 wherein said means for releasably securing is a manually operable locking collar, said locking collar being slidably mounted to said base.

12. An adjustable workpiece support attachment for mounting to a base to facilitate the handling of unwieldy workpieces comprising:
   a generally laterally extending extension wing for being positioned to engage and support at least a portion of said workpiece, said extension wing having two adjacent sides, said adjacent sides forming a generally L-shaped, generally inclined member, said two adjacent sides secured in an abutting relationship forming a downwardly facing angle less than 180°, wherein the apex of said workpiece engaging member provides an area of contact for said workpiece, said workpiece passing over said apex;
   at least one generally vertically disposed extension member pivotally mounted to said extension wing for sliding attachment to said base; and
   means for releasably securing said extension member to facilitate height adjustment of said workpiece support attachment on said base.

13. The support attachment of claim 12 further including roller means attached to the shorter one of said two adjacent sides.

14. The support attachment of claim 13 wherein said roller means is a ball bearing.

15. An adjustable workpiece support attachment for mounting to a base to facilitate the handling of unwieldy workpieces comprising:
   a generally laterally extending workpiece engaging member for being positioned to engage and support at least a portion of said workpiece, said workpiece engaging member having two adjacent sides hingedly attached for movement between a platform-like position and a ramp-like position, said workpiece engaging member further including a removable roller means attached to one of said adjacent sides, such that said roller means is at all times below the apex of said workpiece engaging member, such that when said workpiece engaging member is in said ramp-like position, the workpiece will come into contact with said roller means after passing over the apex of said workpiece engaging member, and when said workpiece engaging member is in said platform-like position, the workpiece will not contact said roller means;
   at least one generally vertically disposed extension member pivotally mounted to said workpiece engaging member for sliding attachment to said base; and
   means for releasably securing said extension member to facilitate height adjustment of said workpiece support attachment on said base.

* * * * *